(12) United States Patent
Smith et al.

(10) Patent No.: US 11,946,583 B1
(45) Date of Patent: Apr. 2, 2024

(54) FLEXIBLE CONFORMING SILICONE RUBBER HEATER FOR COMPLEX GEOMETRY FLUID LINES AND METHOD

(71) Applicants: Jason S. Smith, Crystal Lake, IL (US); Nicholas V. Hein, Woodstock, IL (US); Morgan J. Schultz, McHenry, IL (US)

(72) Inventors: Jason S. Smith, Crystal Lake, IL (US); Nicholas V. Hein, Woodstock, IL (US); Morgan J. Schultz, McHenry, IL (US)

(73) Assignee: Durex International Corp., Cary, IL (US)

( * ) Notice: Subject to any disclaimer, the term of this patent is extended or adjusted under 35 U.S.C. 154(b) by 258 days.

(21) Appl. No.: 17/206,006

(22) Filed: Mar. 18, 2021

Related U.S. Application Data

(60) Provisional application No. 62/991,522, filed on Mar. 18, 2020.

(51) Int. Cl.
*F16L 53/00* (2018.01)
*F16L 53/34* (2018.01)
*F16L 59/02* (2006.01)
*F16L 59/153* (2006.01)

(52) U.S. Cl.
CPC ............ *F16L 59/028* (2013.01); *F16L 53/34* (2018.01); *F16L 59/026* (2013.01); *F16L 59/029* (2013.01); *F16L 59/153* (2013.01)

(58) Field of Classification Search
CPC ....... F16L 59/028; F16L 53/34; F16L 59/026; F16L 59/029; F16L 59/153
USPC ............................................ 138/110, 149, 33
See application file for complete search history.

(56) References Cited

U.S. PATENT DOCUMENTS

| | | | | |
|---|---|---|---|---|
| 2,532,587 A * | 12/1950 | Williamson | ............ | F16L 59/12 138/148 |
| 3,971,416 A * | 7/1976 | Johnson | ................. | H02G 15/10 137/341 |
| 4,194,536 A * | 3/1980 | Stine | ...................... | F16L 59/153 392/480 |
| 4,281,238 A * | 7/1981 | Noma | ...................... | H05B 3/58 219/535 |
| 5,601,894 A * | 2/1997 | Maruschak | ............... | B32B 1/08 428/920 |
| 6,031,972 A * | 2/2000 | Barker | .................... | F24H 1/105 392/479 |
| 6,213,157 B1 * | 4/2001 | Thiebaud | ................ | F16L 59/14 138/112 |

(Continued)

*Primary Examiner* — James F Hook
(74) *Attorney, Agent, or Firm* — Charmasson, Buchaca & Leach, LLP

(57) ABSTRACT

A flexible, substantially lamellar silicone foam rubber-based heater for heating fluid lines such as high temperature gas supply and exhaust lines used in microelectronic semiconductor fabrication uses a flexible, oblong substantially longitudinally uniform heater body including an oblong block of a thermally conductive, resiliently compressible material for conforming the heater to a line of complexly shaped components connected in series. The block can be supported by a silicone rubber support layer in contact with a flexible heater element containing layer, and an outer silicone foam rubber insulation layer. Fasteners, such as separatable retaining bands spaced along the line can hold the heater in place. A matable pair of bodies, or a single folded body can enwrap the line.

15 Claims, 5 Drawing Sheets

(56) References Cited

U.S. PATENT DOCUMENTS

| | | | | |
|---|---|---|---|---|
| 6,978,825 B1* | 12/2005 | Baylot | ................... | E21B 17/01 |
| | | | | 165/45 |
| 2005/0241717 A1* | 11/2005 | Hallot | ................... | F16L 59/143 |
| | | | | 138/108 |
| 2010/0018601 A1* | 1/2010 | Princell | ................ | F16L 59/147 |
| | | | | 138/149 |
| 2011/0056931 A1* | 3/2011 | Schlipf | .............. | B29C 45/2737 |
| | | | | 219/548 |
| 2019/0100298 A1* | 4/2019 | Gladstone | ............ | F16L 59/028 |

\* cited by examiner

FLEXIBLE CONFORMING SILICONE RUBBER HEATER FOR COMPLEX GEOMETRY FLUID LINES AND METHOD

PRIOR APPLICATION

This application claims the benefit of U.S. provisional utility patent application Ser. No. 62/991,522, filed 2020 Mar. 18, incorporated herein by reference.

FIELD OF THE INVENTION

The instant invention relates to insulated conduit heater systems and more particularly to heater systems for fluid supply and exhaust lines used in manufacturing.

BACKGROUND

Many industries such as semiconductor fabrication, medical treatment, and various types of manufacturing, require heated conduit lines for fluids, including gasses, liquids, solids or semisolids in liquid suspension, phase change materials such as gallium, imperfect vacuums, and the like. For example liquid metal supply lines for use in x-ray equipment must be heated to maintain the proper temperature of the liquid metal.

Similarly, for example, the microelectronic semiconductor fabrication industry in particular involves the need for highly regulated gas transmission lines leading to and from the fabrication vessels used to process semiconductor wafers. These specialized gasses are used for processing applications such as low pressure chemical vapor deposition (LPCVD), metal organic chemical vapor deposition (MOCVD), high density chemical vapor deposition (HDCVD), atomic layer deposition (ALD), controlled sublimation, and plasma etch for example.

Generally speaking, preprocess fluid supply and post process exhaust lines used in semiconductor fabrication can include all the components which carry gas from the gas canisters or bottles, to the process chamber, and thereafter to the abatement equipment or scrubbers. These components can include for example tubes, connectors, valves, regulators, mass flow controls, pumps, elbows, tees, reducers and manifolds. Exhaust lines which carry gasses away from the process chamber can also be referred to as forelines, or pump lines.

These components often have a complex geometries.

Gas delivery and exhaust lines are typically made from stainless steel. Supply lines can typically have a diameter of between about 0.25 inch (6.3 mm) and 0.75 inch (19 mm), while exhaust lines can typically range from between about 1.5 inch (38 mm) and 6.0 inches (152 mm). Even though supply line tubes may have an inner diameter of less than about 2 cm, the outer profile to be accommodated by the heater can be much larger. For many medical device applications, fluid-carrying tubes can have outer diameters smaller than 2 mm.

The gasses delivered to and removed from the wafer fabrication reaction chamber often must be kept within a narrow range of temperatures, typically between about 70 degrees centigrade (70 C) and 250 C, in order primarily to prevent condensation from occurring in supply lines, and sublimation of materials in the exhaust lines. In supply lines, condensation or sublimation can cause defects in semiconductor devices, reducing production yields and increase the need for more frequent and/or difficult costly maintenance.

A typical CVD tool can have up to 30 or more individual gas transmission line heaters internal to the tool which can be controlled individually or in a master/slave configuration. Gas supply canisters can be located several hundred feet away and require multiple heaters along the transmission line. Similarly, exhaust lines are often many tens of feet long leading to scrubbers or other abatement equipment.

Lines can be heated using a heater blanket or mantle heater which wraps around the gas carrying component such as a pipe. Silicone foam rubber provides a much cleaner, flexible solution. Heater equipment using wire wound heater elements covered by a silicone foam rubber insulating material has been developed as disclosed in Hauschulz et al., U.S. Pat. No. 5,714,738, incorporated herein by reference. However, such heaters must be sized and shaped to closely fit the geometry of the particular pipe or other gas-carrying component upon which they are mounted. Thus such heaters cannot be used on components having grossly different geometries or on lines that have been shifted or bent to accommodate unforeseen structural obstacles. Further, the electrical heater elements can often be delicate wire structures that can be damaged when heater is flexed or stretched too severely.

In the medical field, microtube lines are often used to move minute amounts of liquids within equipment that must be kept within a narrow range of temperatures. In the past, heating those lines often used heater elements that were integrated with the microtube, such that there was no way to remove the heater to clean or replace the tube. In such situations, the entire line, including the heater had to be replaced, often at great cost. The instant invention results from efforts to provide an improved fluid transmission line heater system which addresses one or more of the above problems.

SUMMARY

The primary and secondary objects of the invention are to provide an improved fluid line heater system. These and other objects are achieved by providing an oblong flexible heater body that includes a compressible layer that can conform to the complex-shaped structures of a fluid transmission line.

In some embodiments there is provided a device for contact heating a fluid transmission line, said device comprises: a first oblong body which comprises: a block of resiliently compressible, conforming material having a first surface and a second surface separated by a thickness; said first surface being oriented to contact said fluid transmission line; a silicone rubber support layer bonded to said second surface; and, a heater element layer supporting an electrical heater element; wherein said heater element layer is superimposed over said silicone rubber support layer.

In some embodiments the device further comprises: an insulation layer superimposed over said heater element layer.

In some embodiments the device further comprises: a second oblong body substantially similar to said first oblong body; wherein said bodies are mated to one another enclosing said fluid transmission line apart from input and output ports.

In some embodiments the device further comprises: said first oblong body being folded over longitudinally to surround said fluid transmission line, whereby said layers have a substantially coaxial orientation.

In some embodiments said first oblong body is substantially longitudinally uniform along a length, and wherein said block has a substantially uniform compressibility extending along said length.

In some embodiments the device further comprises: a second oblong body substantially similar to said first oblong body; wherein said bodies are mated to one another enclosing said fluid transmission line apart from input and output ports.

In some embodiments said first surface is substantially flat in a first configuration and substantially conforming to said fluid transmission line in a second configuration.

In some embodiments the device further comprises: a fluid transmission line, comprising: a first component having a first geometry; a second component having a second geometry different from said first geometry; wherein said first and second components are connected in series; wherein said first surface extends continuously over said first and second components.

In some embodiments the device further comprises said fluid transmission line having at least one inflow port and at least one outflow port; and wherein said bodies surround said fluid transmission line apart from said ports.

In some embodiments said block is made from a material comprising a thermally conductive closed cell silicone sponge rubber.

In some embodiments said block is made from a material comprising silicone rubber having a durometer of at least 13 A.

In some embodiments the device further comprises a shim reinforcement layer between said silicone rubber support layer and said heater element layer.

In some embodiments the device further comprises a cover patch layer comprising silicone rubber material; wherein said cover patch layer is located between said a shim reinforcement layer and said insulation layer.

In some embodiments said thickness is between 5.0 mm and 50 mm.

In some embodiments the device further comprises a plurality of spaced apart fasteners engaging said first body without contacting said fluid transmission line.

In some embodiments the device further comprises: at least one silicone rubber isolation strip laterally contacting said block.

In some embodiments the device further comprises a plurality of elastic wrapping straps enwrapping said bodies at spaced apart locations along an outer surface of said mated bodies.

In some embodiments the device further comprises a hinge of flexible material connecting said bodies along a common first side.

In some embodiments said hinge comprises a silicone cover patch layer of said first body extending continuously in a C-shaped manner to form a silicone cover patch layer of said second body along said common first side.

In some embodiments the device further comprises an electrical cable extending into said heater element containing layer.

In some embodiments there is provided a method for uniformly heating a semiconductor fabrication fluid line having a plurality of interconnected differently shaped line components, said method comprises: selecting a matable pair of bodies; wherein a first one of said matable pair comprises a first block of thermally conductive compressible material; wherein a second one of said matable pair comprises a second block of thermally conductive compressible material; pressing said line into said first block; squeezing said line between said first block and said second block to form a mated pair enclosing a portion of said line including said components; and, wrapping a plurality elastic straps around said mated pair.

In some embodiments there is provided a method for uniformly heating a fluid line having at least one interconnected differently shaped line component, said method comprises: selecting a substantially longitudinally uniform flexible first body comprising a first block of resiliently compressible material and a first heater element layer; contacting said fluid line with said first block; and, engaging a fastener to hold said first block against said fluid line.

In some embodiments said method further comprises: folding said first body upon itself longitudinally about said fluid line; and, compressing said first block against said fluid line, thereby enclosing a portion of said fluid line including said component.

In some embodiments said method further comprises: selecting a substantially longitudinally uniform flexible second body comprising a second block of resiliently compressible material and a second heater element layer; mating said first body and said second body so that said first block and said second block contact said fluid line; and, compressing said first block and said second block against said fluid line, thereby enclosing a portion of said fluid line including said component.

In some embodiments said method further comprises further comprises: separating said first body from said fluid line; cleaning said fluid line; replacing said first body with a replacement body; mating said fluid line with said replacement body, wherein said method is performed in absence of replacing said fluid line.

In some embodiments said method is performed in absence of longitudinally adjusting the position of said heater to align it longitudinally with said component.

In some embodiments there is provided the combination of a semiconductor fabrication vessel fluid transmission line having a heatable outer surface having a plurality of interconnected differently shaped line components, and a line enwrapping heater having inner surfaces shaped and dimensioned to intimately contact said outer surface; said heater comprises: a pair of oblong bodies mated to one another along an interface straddling said inner surfaces; wherein each of said oblong bodies comprises: a block of thermally conductive resiliently compressible material having a first surface and a second surface separated by a thickness; said first surface forming one of said inner surfaces; a silicone rubber support layer contacting said second surface; a heater element supporting layer; and, an insulation layer.

The content of the original claims is incorporated herein by reference as summarizing features in one or more exemplary embodiments.

DESCRIPTION OF THE EXEMPLARY EMBODIMENTS

Figure 3:
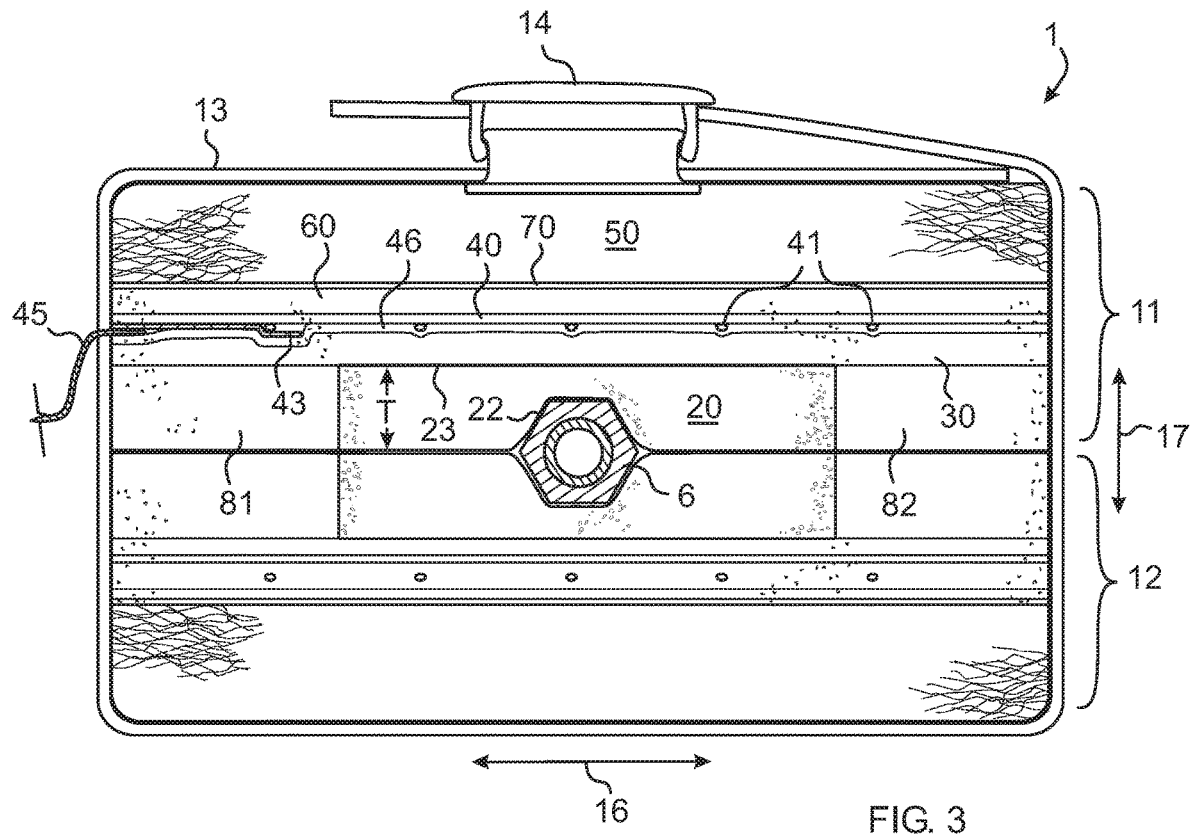
FIG. 3 is a diagrammatical cross-sectional view of the heater system of FIG. 2 taken along line 3-3.

In this specification, the references to top, bottom, upward, downward, upper, lower, vertical, horizontal, sideways, longitudinal, lateral, back, front, etc. can be used to provide a clear frame of reference for the various structures with respect to other structures while the heater body is oriented to be resting flat on the ground as shown in FIG. 3, and not treated as absolutes when the frame of reference is changed, and/or the heater is flexed such as when the heater is mounted to a complexly shaped and oriented fluid transmission line.

The term "substantially" can be used in this specification because manufacturing imprecision and inaccuracies can lead to non-symmetricity and other inexactitudes in the shape, dimensioning, uniformity, and orientation of various structures, and their degree of close contact with adjacent structures. Further, use of "substantially" in connection with certain geometrical shapes, letter shapes, such as "C-shaped" and orientations, such as "parallel" and "perpendicular", can be given as a guide to generally describe the function of various structures, and to allow for slight departures from exact mathematical geometrical shapes, letter shapes, and orientations, while providing adequately similar function. Those skilled in the art will readily appreciate the degree to which a departure can be made from the mathematically exact geometrical references.

If used in this specification, the word "axial" is meant to refer to directions, movement, or forces acting substantially parallel with or along a respective axis, and not to refer to rotational nor radial nor angular directions, movement or forces, nor torsional forces unless otherwise noted.

In this specification the units "millimeter" or "millimeters" can be abbreviated "mm", units "centimeter" or "centimeters" can be abbreviated "cm", and temperature degrees Centigrade can be abbreviated "C".

The preferred embodiment will describe a heater and method of installation in the context of a semiconductor fabrication gas transmission line, often referred to here as a fluid line. Those skilled in the applicable art will readily appreciate that the device and method can be used to heat other lines carrying other flowable materials such as, but not limited to, gases, liquids, solids or semisolids in liquid suspension, phase change materials, and imperfect vacuums, in other fields of manufacturing. In most applications, including semiconductor fabrication, the tubes forming the lines will have an inner diameter of less than about 2 cm. However, the outer profile including interconnecting components to be accommodated by the heater can be much larger. For many medical device applications, fluid-carrying tubes can have outer diameters that are less than 2 mm.

Figure 1:
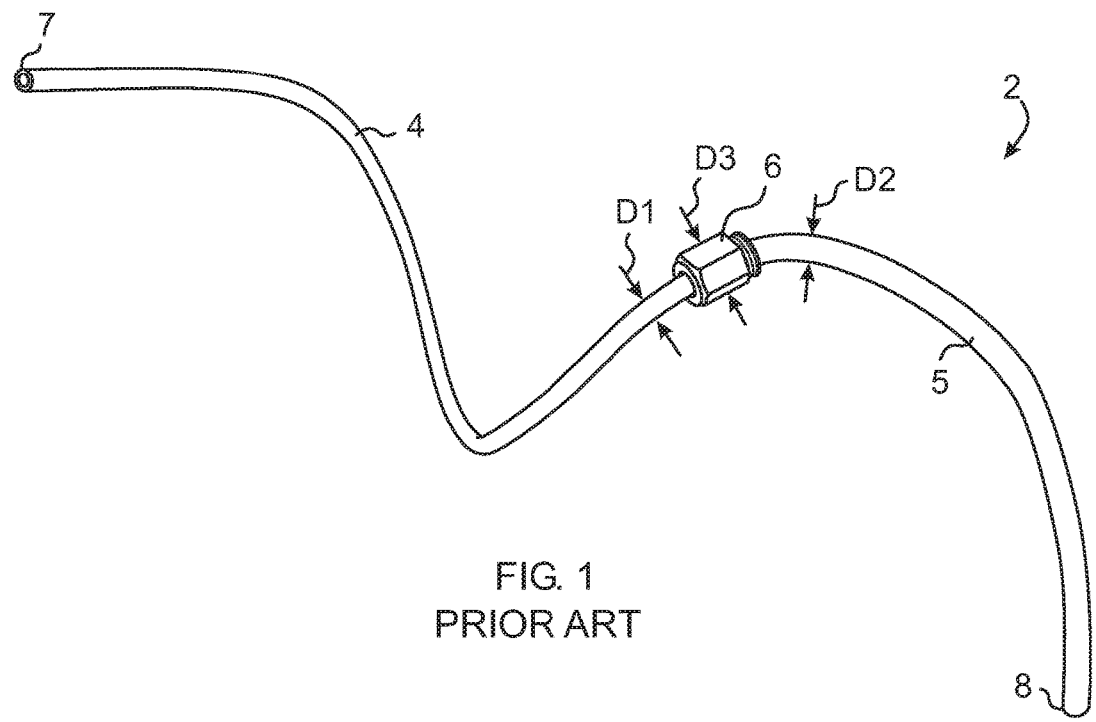
FIG. 1 is a prior art diagrammatical perspective view of a fluid transmission line showing differently shaped and dimensioned components connected in series.
Figure 2:
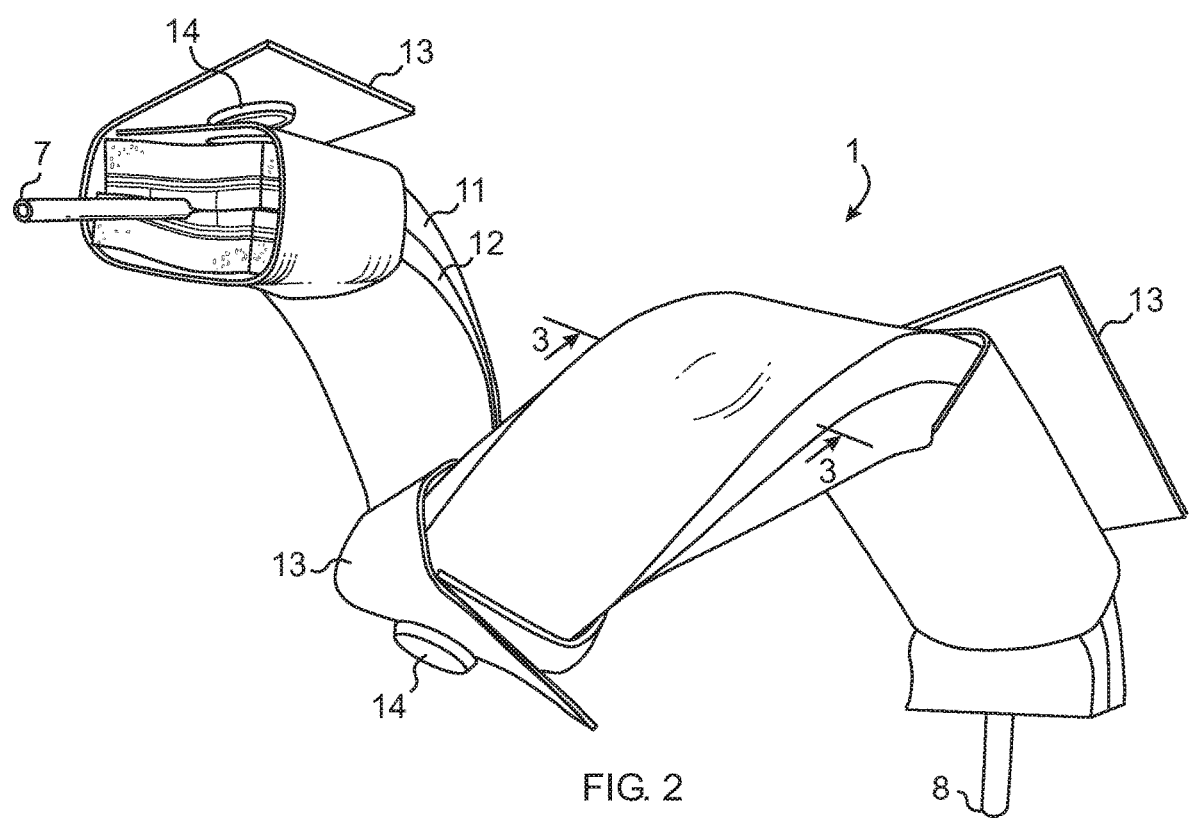
FIG. 2 is a diagrammatical perspective view of a heater system according to an exemplary embodiment of the invention emplaced upon the fluid line of FIG. 1.

Referring now to the drawing, there is illustrated in FIGS. 1-3 a flexible, conforming heater 1 used to heat a typical three-dimensionally complex stainless steel transmission line 2 which carries a flow of fluid to or from a microelectronic semiconductor reaction chamber for example. The transmission line can be formed by a number of components 4, 5, 6 having different geometries connected in series to form a line having at least one inflow port 7 and at least one outflow port 8. For example, the line can have first tubular component 4 having a substantially circular cross-sectional geometry having a first outer diameter D1, and a second tubular component 5 having a substantially circular cross-sectional geometry having a second outer diameter D2 larger than the first diameter. The two tubular sections can be joined by a fitting component having a fastening nut 6 having a substantially hexagonal cross-sectional geometry that has a dimension D3 perpendicular to the line that is larger than both the diameters of the tubular components. In this way the fluid transmission line can be said to have local geometric variability. Even lines having a uniform cross-section can be formed into complex and often unpredictable shapes.

The heater system 1 can include a pair of oblong bodies 11, 12 which can oppose one another and come together to enclose the fluid transmission line 2 therebetween, apart from the ports 7, 8 as shown in FIG. 2. A plurality of elastic retaining straps 13 can hold the bodies together by wrapping around the exposed outer surfaces of the bodies. The straps can be flexible swatches of fabric secured by snap fasteners 14 or other mechanical fasteners including, but not limited to, buckles, hooks, and Velcro type hook-and-vane fabric fasteners. Other means for fastening the bodies to the fluid line can include, but are not limited to: zip ties, beaded ties or other discrete position adjustable straps, D-ring type clamping structures, spring steel clips, tapes, such as silicone tape, shrink wrap materials, and even custom-formed silicone clipping structures. These types of fastening structures allow the structure, and hence the heater system, to be removed for cleaning, repair and/or replacement without requiring the fluid line to be replaced.

In this way, the heater bodies can be entirely flexible so that they can flexibly wrap over opposite sides of the fluid line so as to enwrap it apart from the component inlet and outlet. It shall be noted that the heater can extend continuously over the line including the different components. Further, each heater body can be substantially longitudinally uniform so that no one longitudinal part of the heater body is substantially different than another part. In this way the longitudinal positioning of the heater is not critical. In other words, the heater would be just as effective on the covered part of the fluid line, namely the fitting nut 6 regardless of whether the heater is positioned a few inches in either direction longitudinally from the nut. In addition, the fasteners can interact with the heater bodies without fastening against the fluid line. In other words, due to the resiliency of the compressible material contacting the differently shaped components of the fluid line, the heater can be held in place by friction alone, avoiding the use of glues or other fasteners which contact the fluid line. This effectively longitudinally restricts further movement of the heater along the fluid line.

Figure 4:
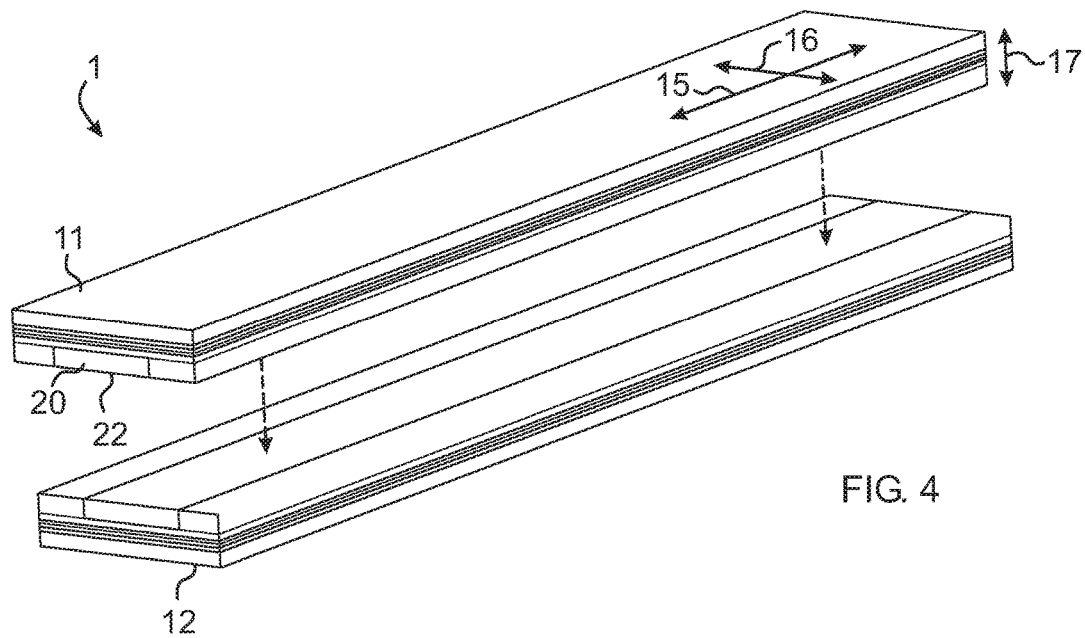
FIG. 4 is a diagrammatical perspective view of a separated pair of opposing heater bodies according exemplary embodiment of the invention.

As shown in FIGS. 3 and 4, each body 11, 12 is longitudinally oblong. Arrows show the longitudinal 15, lateral 16, and thickness 17 dimensions as they orient to the heater bodies.

Each body 11, 12 has a substantially lamellar construction including a block 20 of resiliently compressible material which is selected to conform to the underlying geometry of the fluid line, thus greatly reducing the insulating air gaps that form between two differently shaped components. The blocks can be oriented to oppose one another. Each block therefore can have a first exposed surface 22 oriented to contact the fluid transmission line 6 and a second surface 23 separated by a thickness T. For many typical applications the thickness can be between about 5.0 mm and 50 mm. A silicone rubber support layer 30 can be bonded to the second surface. A heater element layer 40 supporting an electrical heater element 41 can be superimposed over the silicone rubber support layer. An insulation layer 50 can be superimposed over the heater element layer.

The block 20 of resiliently compressible material can be made of a thermally conductive, closed cell silicone sponge rubber such as 10404 series ThermaCool brand material commercially available from Saint-Gobain Performance Plastics company of Courbevoie, France. Because the material is resilient, it can slightly expand to fill gaps between differently shaped fluid line components and thus afford better conduction of the heat from the heater element layer to the line components. Because the material can be closed cell, it is believed that in the context of a heater that is installed cool, then later heated, the material will slightly expand to better fill gaps between differently shaped and dimensioned components, thereby establishing more contact with the surfaces of the fluid line components than would be expected upon heating an open cell material. Alternately, a silicone rubber layer having a durometer of at least 13 A on the Shore durometer scale can be useful in reducing air gaps between components without the use of other time consuming gap-filling measures such as through thermal grease which can make cleaning and repair more time-consuming. In addition, the block can have substantially uniform compressibility so that the longitudinal positioning of the heater on the fluid line need not be precise. It has been found that a variation of compressibility across the block of preferably less than +/−0.5 A, more preferably less than +/−0.1 A on the Shore durometer scale will provide adequate uniformity for most applications. Typically, such uniformity can easily be achieved by selecting a monolithic piece of material for the block, or pieces from the same manufacturing lot.

The exposed surface 22 of the block 20 of thermally conductive resiliently compressible material is intended to contact the outer surfaces of the fluid line components. However, alternately, a thin protective layer may be provided to toughen the outer surface of the block against damage from relatively sharp components without significantly diminishing the thermal conductivity between the heater element and line. Further, thermal grease can be applied between the outer surface of the block and the fluid line component surfaces.

The silicone rubber support layer 30 can be bonded to the second surface 23 of the block 20. Bonding preferably occurs by curing the silicone rubber while it is in contact with the second surface.

Metalization shims 43 made of copper or other conductive material can provide a broader electrical contact to the heater element 41 so that a more rugged electrical connection can be made with an electrical cable 45 for carrying power and signals to other embedded circuitry (not shown).

Any shims 43 can be held in place by a shim reinforcement layer 46 made of one or more sheets of uncured or partially cured silicone rubber. In this way the shim layer and its reinforcement layer can protect the heater from longitudinal stretching which could damage the metalization such as the heater elements or their internal electrical connections, or other structures.

A cover patch layer 60 made from silicone rubber can contact the heater element layer 40 to provide further protection and ruggedness to the heater. An insulation bond layer 70 can use silicone rubber that is cured in place to bond the cover patch layer to the insulation layer 50. The insulation layer can be made from fiberglass reinforced silicone rubber.

Lateral silicone rubber isolation strips 81, 82 can straddle the block 20 thus encouraging the installer to locate the fluid line in the middle of the heater. Alternately, one of the strips 82 can be eliminated, leaving a void which further encourages proper installation. Because of the flexibility of the materials forming the heater, the silicone rubber support layer 30 will be squeezed down during installation to substantially fill the void.

Alternately, for those situations that do not require enhanced thermal conductivity, the block 20 of thermally conductive resiliently compressible material can be replaced with silicone so that the block 20, the support layer 30, and any isolation strips 81, 82 can be formed by a uniform layer of silicone.

During manufacturing, each silicone rubber layer or strip can be formed by a number of stacked thinner sublayers that have been uncured or partially cured. During the curing process, adjacent silicone rubber layers will bond to one another. In addition during the curing process the silicone rubber contacting the heat conducting conforming layer will bond to it.

Because of the lamellar construction, various reinforcing structures such as metal strips, screens, fiberglass fabric, and the like can be sandwiched within sublayers at various locations to easily adjust rigidity depending on the application for which the heater is constructed. Usually there is a tradeoff between greater flexibility and ruggedness.

FIG. 4 shows that the heater bodies can be substantially longitudinally uniform so that the longitudinal positioning of the heater on the fluid line need not be precise. This can be a great time saver in initial installation of the heater.

Figure 5:
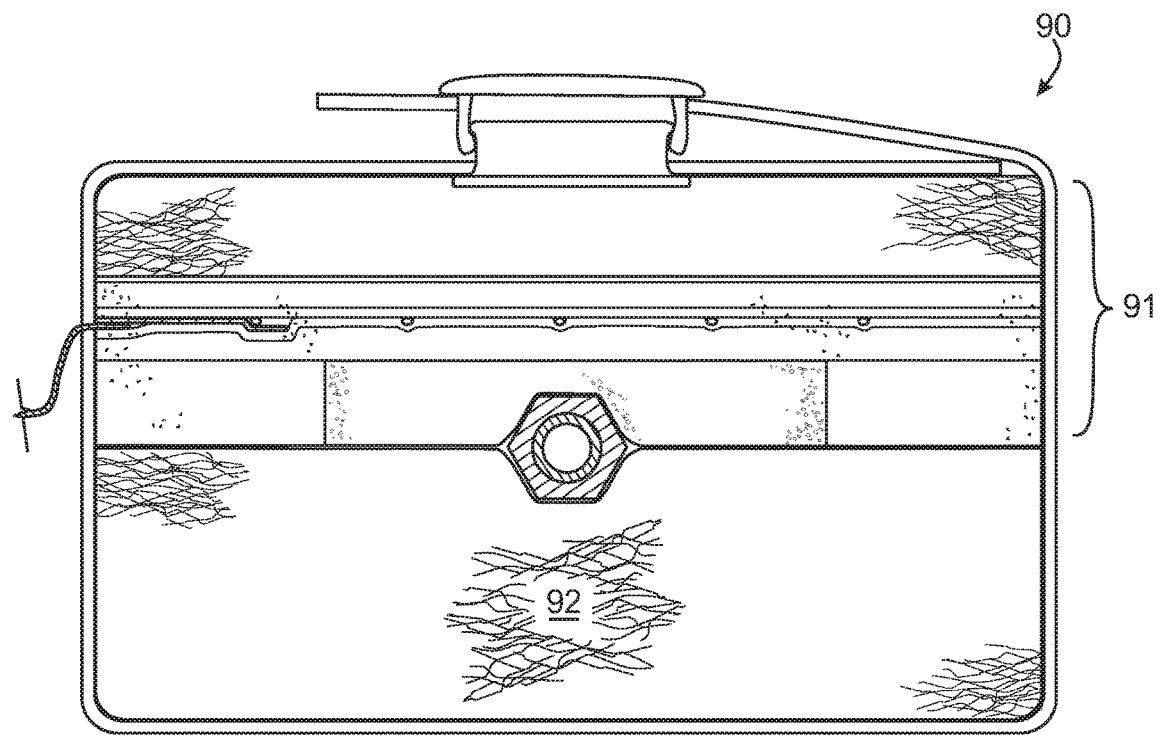
FIG. 5 is a diagrammatical cross-sectional view of an alternate the heater system having a single lamellar heater body mated to a passive insulating body.

FIG. 5 shows an alternate embodiment of a flexible conforming heater 90 using a single oblong flexible heater body 91 that can be mated with an oblong strip of insulation 92 or other compatible, heat-withstanding flexible passive material such as fiberglass impregnated silicone rubber.

Figure 6:
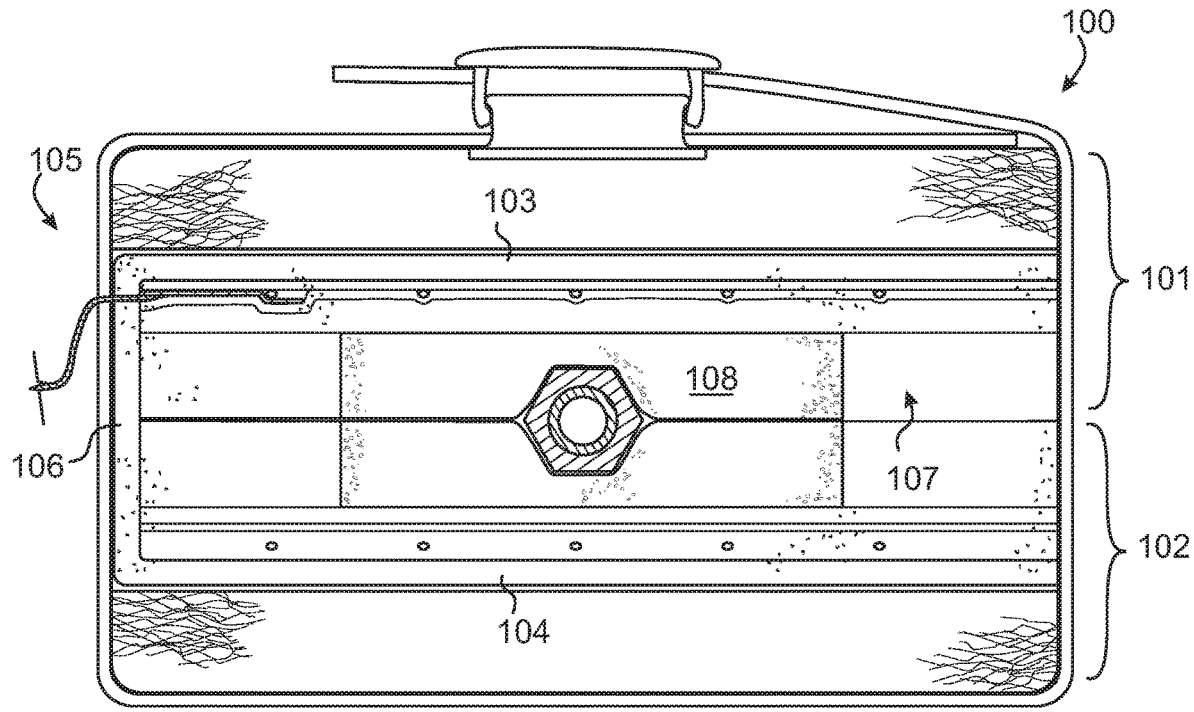
FIG. 6 is a diagrammatical cross-sectional view of an alternate heater system having two opposing bodies hinged together.

FIG. 6 shows an alternate embodiment of a flexible conforming heater 100 wherein the silicone rubber cover patch layers 103, 104 for each body 101, 102 extend continuously along a common first side 105 in a C-shaped manner to form a flexible hinge 106 of silicone rubber material. This helps the two bodies to be brought together in alignment. Alternately, one or more of the straps 13 can be bonded to a common side of the two bodies to form a hinge. This embodiment also show a void 107 laterally abutting one side edge of the flexible, conforming material block 108 on the upper heater body 101.

Figure 7:
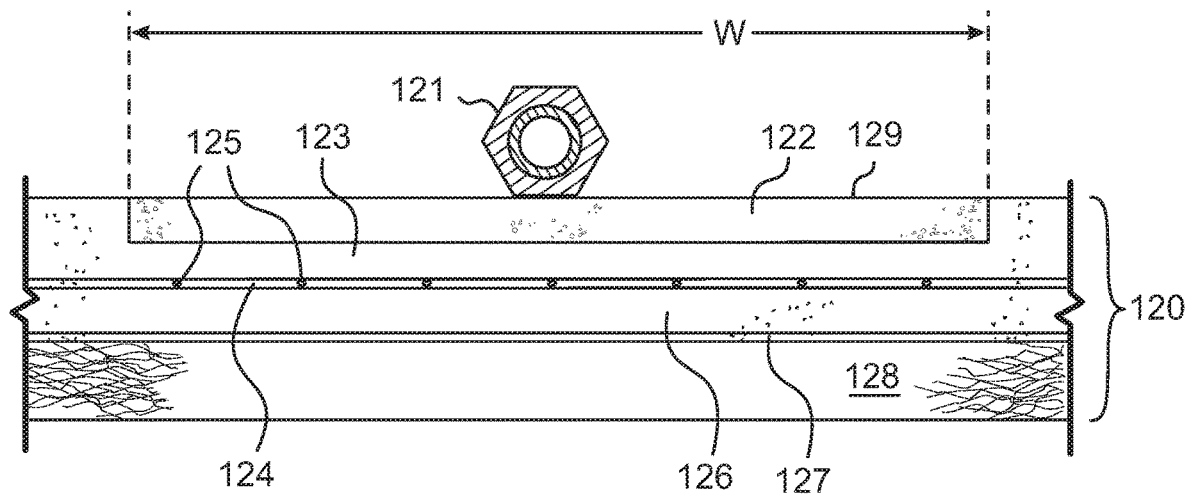
FIG. 7 is a diagrammatical cross-sectional view of an alternate heater system having a single lamellar heater body that wraps around a fluid line.
Figure 8:
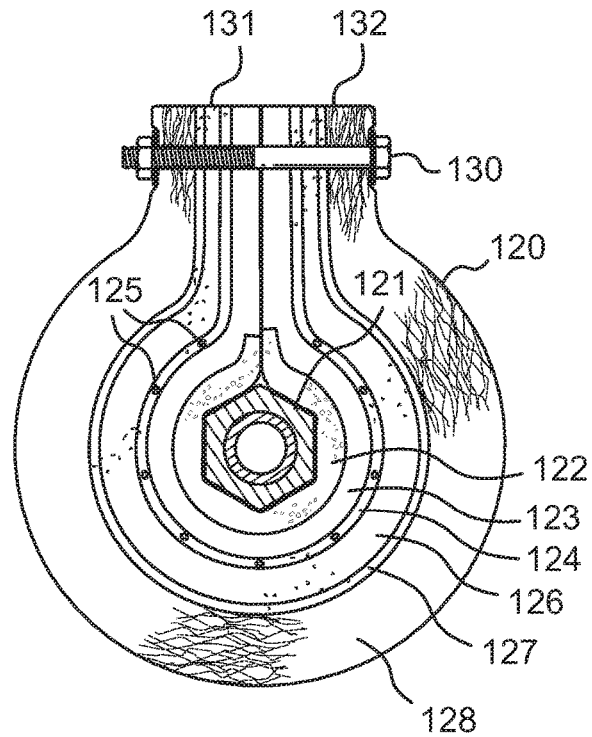
FIG. 8 is a diagrammatical partial cross-sectional view of the heater system of FIG. 7 installed on a fluid line.

FIGS. 7-8 show an alternate embodiment of a flexible conforming heater which includes a single lamellar heater body 120 that is wide enough to wrap completely around a fluid line 121. The body can be formed similarly to one of the bodies of the heater shown in FIG. 3. Thus, the body can include a block 122 or resiliently compressible material for providing close contact to the unpredictable surface of the fluid line. The block can have a lateral width W which is sufficient to allow the surface 129 of the block circumscribe the fluid line when the body is wrapped around the fluid line. The block can be supported by a silicone support layer 123 bonded to a surface of the block. A heater element layer 124 supporting an electrical heater element 125 and potentially additional circuitry can be bonded to the silicone support layer. A cover patch layer 126 made from silicone rubber can contact the heater element layer 124 to provide further protection and ruggedness to the heater. An insulation bond layer 127 can bond the cover patch layer to an insulation layer 128.

As shown in FIG. 8 the lamellar heater body 120 can be folded or curved longitudinally into a substantially C-shaped configuration in order to completely wrap around the fluid line 121 so that the resiliently compressible material layer is oriented to contact the outer surface of the fluid line. In this configuration the successive layers of the body are substantially coaxial and concentric with the fluid line, where each successive layer is superimposed over the radially inwardly adjacent layer.

The body 120 can be held in its folded or curved shape upon the fluid line 121 by a plurality of fasteners 130 engaging the lateral ends 131, 132 of the body. As with the earlier embodiments, the fasteners can be of various types which either engage the lateral ends of the body as shown, or utilize a strap or clamp which can surround the exposed outer surface of the body similar to the structure shown in FIGS. 2-3.

Alternately, and similar to the embodiment of FIG. 3, the block 120 of resiliently compressible material can be replaced with silicone so that the block and the support layer 123, can be formed by a unitary layer of silicone. Care can be exercised in selecting silicone having an adequate resiliency property so that the outer surfaces of the fluid line are substantially contacted.

Figure 9:
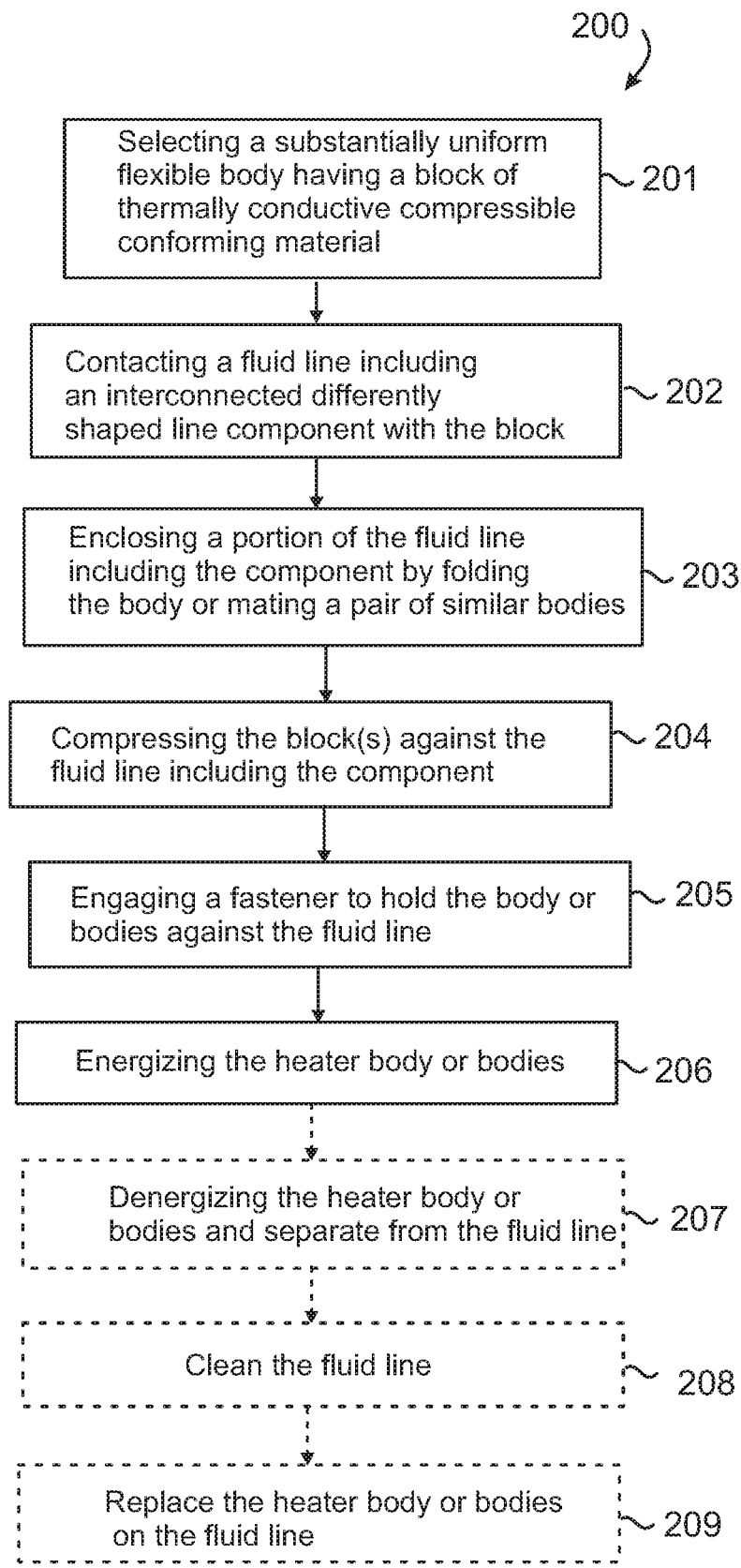
FIG. 9 is a flow chart diagram of a heating process according to an exemplary embodiment of the invention.

FIG. 9 shows a method 200 for uniformly heating a fluid transmission line having a plurality of interconnected differently shaped line components. The method includes first selecting 201 a substantially uniform flexible body having a block of thermally conductive compressible conforming material. Installing the heater onto the fluid line can include contacting the fluid line, along a portion that includes at least one of the interconnected differently shaped line components, with the block 202, then enclosing 203 that portion of the line by folding the body or mating the body with a second similar body. The block or block are then compressed 204 against the line to ensure adequate proximity of the hear element layer, and to longitudinally restrict further movement of the heater due to the differently shaped enclosed components. A fastener can be engaged 205 to hold the folded body, or mated bodies in position against the fluid line. The fastener can be in the form of a plurality of longitudinally spaced apart retaining straps wrapping around the heater. Lastly, the heater can be energized 206 to heat the fluid line components.

Because of the substantially longitudinally uniform nature of the heater, installation can occur in absence of any precise longitudinal alignment of the blocks to the components on the portion of the fluid transmission line being heated.

Because the heater is so flexible, it can be installed on vastly differently shaped lines. This can be a great advantage to users who need to bend their lines around unforeseen structures during installation yet would like to have a single type of heater accommodate the resulting different shapes.

The heater bodies can then be deenergized and separated 207 from the fluid transmission line, the line cleaned 208, and the heater bodies replaced 209. In this way the method provides for cleaning of the fluid transmission line in absence of replacing the fluid transmission line and heater entirely.

While the preferred embodiment of the invention has been described, modifications can be made and other embodiments may be devised without departing from the spirit of the invention and the scope of the appended claims.

What is claimed is:

1. A device for contact heating a fluid transmission line, said device comprises:
 a first oblong body which comprises:
  a block of resiliently compressible, conforming material having a first surface and a second surface separated by a thickness;
  said first surface being oriented to contact said fluid transmission line;
  a silicone rubber support layer bonded to said second surface;
  a heater element layer supporting an electrical heater element; wherein said heater element layer is superimposed over said silicone rubber support layer; and
  a shim reinforcement layer between said silicone rubber support layer and said heater element layer.

2. The device of claim 1, which further comprises:
 an insulation layer superimposed over said heater element layer.

3. The device of claim 1, which further comprises:
 said first oblong body being folded over longitudinally to surround said fluid transmission line, whereby said layers have a substantially coaxial orientation.

4. The device of claim 1, wherein said first oblong body is substantially longitudinally uniform along a length, and wherein said block has a substantially uniform compressibility extending along said length.

5. The device of claim 1, which further comprises:
 a second oblong body substantially similar to said first oblong body;
 wherein said bodies are mated to one another enclosing said fluid transmission line apart from input and output ports.

6. The device of claim 1, wherein said first surface is substantially flat in a first configuration and substantially conforming to said fluid transmission line in a second configuration.

7. The device of claim 1, which further comprises:
 a fluid transmission line, comprising:
  a first component having a first geometry;
  a second component having a second geometry different from said first geometry;
  wherein said first and second components are connected in series;
  wherein said first surface extends continuously over said first and second components,
  thereby restricting longitudinal movement of said body with respect to said fluid transmission line.

8. The device of claim 7, which further comprises said fluid transmission line having at least one inflow port and at least one outflow port; and wherein said bodies surround said fluid transmission line apart from said ports.

9. The device of claim 1, wherein said block is made from a material comprising a thermally conductive closed cell silicone sponge rubber.

10. The device of claim 1, wherein said block is made from a material comprising silicone rubber having a durometer of at least 13 A.

11. The device of claim 1, which further comprises a cover patch layer comprising silicone rubber material; wherein said cover patch layer is located between said a shim reinforcement layer and said insulation layer.

12. The device of claim 1, which further comprises a plurality of spaced apart fasteners engaging said first oblong body without contacting said fluid transmission line.

13. The device of claim 1, which further comprises an electrical cable extending into said heater element containing layer.

14. A device for contact heating a fluid transmission line, said device comprises:
   a first oblong body which comprises:
      a block of resiliently compressible, conforming material having a first surface and a second surface separated by a thickness;
      said first surface being oriented to contact said fluid transmission line;
      a silicone rubber support layer bonded to said second surface;
      a heater element layer supporting an electrical heater element; wherein said heater element layer is superimposed over said silicone rubber support layer; and,
      at least one silicone rubber isolation strip laterally contacting said block.

15. The combination of a semiconductor fabrication vessel fluid transmission line having a heatable outer surface having a plurality of interconnected differently shaped line components, and a line enwrapping heater having inner surfaces shaped and dimensioned to intimately contact said outer surface; said heater comprises:
   a pair of oblong bodies mated to one another along an interface straddling said inner surfaces;
   wherein each of said oblong bodies comprises:
      a block of thermally conductive resiliently compressible material having a first surface and a second surface separated by a thickness;
      said first surface forming one of said inner surfaces;
      a silicone rubber support layer contacting said second surface;
      a heater element supporting layer;
      an insulation layer; and
      a shim reinforcement layer between said silicone rubber support layer and said heater element supporting layer.

* * * * *